(12) United States Patent
DeGennaro et al.

(10) Patent No.: US 8,161,901 B1
(45) Date of Patent: Apr. 24, 2012

(54) SLICING AND SPREAD-APPLICATING APPARATUS

(75) Inventors: Ronald J. DeGennaro, Holbrook, NY (US); Glenn E. French, Bay Shore, NY (US)

(73) Assignee: Tarpaulin.com, Inc., Woodbury, NY (US)

( * ) Notice: Subject to any disclaimer, the term of this patent is extended or adjusted under 35 U.S.C. 154(b) by 1734 days.

(21) Appl. No.: 11/341,213

(22) Filed: Jan. 26, 2006

Related U.S. Application Data

(60) Provisional application No. 60/647,155, filed on Jan. 26, 2005.

(51) Int. Cl.
*B05C 1/08* (2006.01)
(52) U.S. Cl. ............... 118/13; 118/17; 118/18; 118/23; 118/24; 118/31; 99/352; 99/354; 99/516
(58) Field of Classification Search ............ 118/13, 118/17, 18, 23, 24, 31, 70, 244, 262, 304; 426/302, 307; 99/352, 354, 516
See application file for complete search history.

(56) References Cited

U.S. PATENT DOCUMENTS

| | | | | | |
|---|---|---|---|---|---|
| 2,320,529 | A | * | 6/1943 | MacManus | 118/24 |
| 3,654,894 | A | * | 4/1972 | Rohrbacher et al. | 118/17 |
| 3,878,992 | A | * | 4/1975 | MacManus | 239/553 |
| 4,737,378 | A | * | 4/1988 | Narita et al. | 427/8 |
| 5,162,119 | A | * | 11/1992 | Pappas et al. | 118/13 |
| 6,401,650 | B1 | * | 6/2002 | Heyde | 118/13 |
| 2006/0225646 | A1 | * | 10/2006 | Phallen et al. | 118/24 |

OTHER PUBLICATIONS

Reference 1—photograph of commercially-available slicing/applicating apparatus—date unknown.

* cited by examiner

*Primary Examiner* — Laura Edwards
(74) *Attorney, Agent, or Firm* — Hoffmann & Baron, LLP

(57) ABSTRACT

An apparatus for slicing and applying a spread packaged in a container onto a food item. The apparatus includes an applicating station for applying a pre-selected quantity of the spread onto the food item as the food item is moved therethrough. The apparatus further includes a pumping station in fluid communication with the applicating station for transporting the spread from the container to the applicating station. In one preferred embodiment, a loaf of bread is first sliced and thereafter split open about a hinge extending along the length of the loaf. A spread, e.g., a garlic/butter mixture, is then applied to the exposed bread surface.

16 Claims, 21 Drawing Sheets

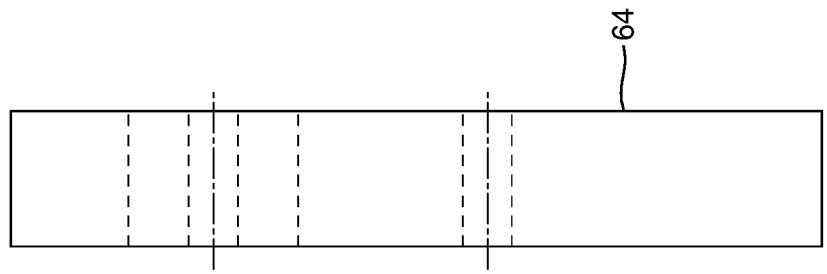
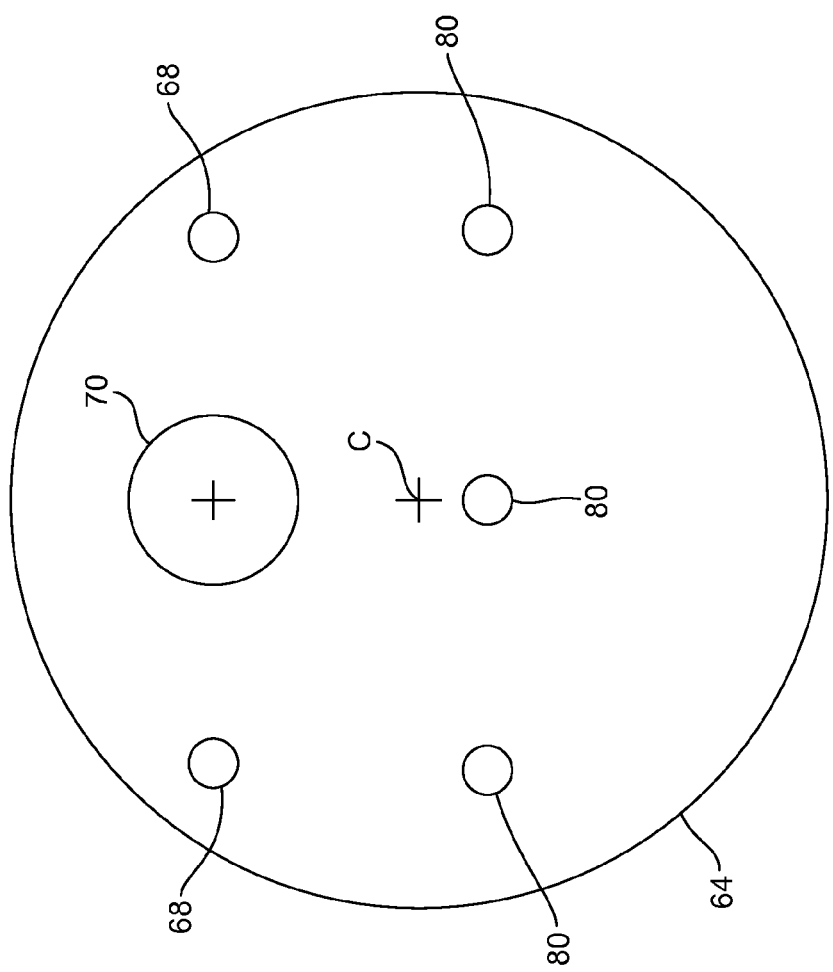

SLICING AND SPREAD-APPLICATING APPARATUS

This application claims the benefit of U.S. Provisional Application Ser. No. 60/647,155 filed on Jan. 26, 2005.

BACKGROUND OF THE INVENTION

The present invention relates to a slicing and spread-applicating apparatus and, more particularly, to an apparatus for slicing selected food items for application of a pre-selected spread thereon.

Food items, such as loaves of bread, may at times be sold with a pre-selected spread already applied thereon. For example, a loaf of bread may be pre-buttered at the manufacturer. Alternatively, a garlic spread or other such topping may be applied to the product at the manufacturer. In this regard, many consumers enjoy the convenience of purchasing the product with the particular spread having already been applied.

Today, spreads are commonly applied to food items, such as loaves of bread, via a manual spreading process. It will be recognized that such a process is very labor intensive, hence expensive. Other known processes involve spraying a spread onto a food item, or passing a food item under a "waterfall" of spread. Such processes, however, generally require complex machinery which is often times expensive to purchase, operate and clean.

There is therefore a need in the art for a discrete, stand-alone machine which is readily operated and cleaned, and which is capable of both slicing a selected food item and thereafter applying a pre-selected spread thereon.

SUMMARY OF THE INVENTION

The present invention, which addresses the needs of the prior art, relates to an apparatus for applying a spread packaged in a container onto a food item. The apparatus includes an applicating station for applying a pre-selected quantity of the spread onto the food item as the food item is moved therethrough. The apparatus further includes a pumping station in fluid communication with the applicating station for transporting the spread from the container to the applicating station. In turn, the pumping station includes a pump having an input and an output. The input is arranged in fluid communication with the container to provide access to the spread. The pumping station also includes a diverter cooperating with the output of the pump whereby at least a portion of the spread exiting the pump may be diverted into the container for agitation of the spread.

The present invention further relates to an apparatus for handling food items adapted to reduce build-up of contaminants. The apparatus includes a conveyor belt for transporting the food items. The apparatus further includes a roller assembly supporting at least one end of the belt, the roller assembly including at least one shaft. The apparatus additionally includes a support member having at least one outer wall, the shaft extending through the outer wall. Finally, the application includes a bearing carried by the outer wall and rotatably supporting the shaft, the bearing being spaced away from the outer wall to allow cleaning access therebetween.

The present invention further relates to an apparatus for applying a spread packaged in a container onto a food item. The apparatus includes an applicating station for applying a pre-selected quantity of the spread onto the food item as the food item is moved therethrough. The apparatus further includes a pumping station in fluid communication with the applicating station for transporting the spread from the container to the applicating station. In turn, the applicating station includes a conveyor belt for transporting the food item therethrough. The applicating station further includes an applicating roller rotatably supported within the applicating station and positioned over the conveyor belt for applying spread onto the food item passing thereunder. The applicating station additionally includes a spread-control roller rotatably supported within the applicating station and positioned adjacent the applicating roller to define an application gap therebetween, the distance between said spread-control roller and the applicating roller being adjustable whereby the size of the gap is varied to control the quantity of spread passing therethrough. Finally, the spread received from the pumping station is dispensed onto the applicating roller whereby subsequent rotation of the applicating roller results in application of the spread onto the food item.

The present invention further relates to an apparatus for transporting and slicing a food item. The application includes a feeding section for receiving the food item. The application further includes a cutting station positioned downstream of the feeding section, the cutting station including a cutting instrument for slicing the food item. In turn, the feeding section includes a first elongate guide member extending towards the cutting instrument and fixed with respect thereto. The feeding station further includes a second elongate member extending towards the cutting instrument and spaced a pre-selected distance from the first guide member. Finally, at least a portion of the second guide member is biased towards the first guide member in proximity to the cutting instrument whereby the food item is urged into a pre-selected orientation prior to contact with the cutting instrument.

The present invention further relates to an apparatus for transporting items. The apparatus includes a frame. The apparatus also includes an endless conveyor belt supported by the frame. A first portion of the belt travels through a transportation path and a second portion of the belt travels through a serpentine return path. The apparatus further includes first and second rollers positioned along the serpentine return path and rotatably contacting the belt. The application also includes an opposing pair of support members carried by the frame, the support members movable between a first and a second position. Finally, the first roller is rotatably supported on opposing ends by the members whereby movement of the members from the first position to the second position simultaneously moves the first roller out of rotating contact with the belt to slacken the belt.

The present invention further relates to an apparatus for applying a spread onto a food item. The apparatus includes an applicating station for applying a pre-selected quantity of the spread onto the food item as the item is moved therethrough. The apparatus also includes a pumping station in fluid communication with the applicating station for transporting the spread to the applicating station. The apparatus additionally includes a conveyor belt for transporting the food items through the applicating station. A first portion of the belt travels through a transportation path and a second portion of the belt travels through a return path. The application apparatus further includes a first collection basin positioned proximate an end of the conveyor belt and located downstream of the applicating station to collect excess spread contacting the belt. Finally, the apparatus includes a continuous wiper attached to the basin and extending across the width of the belt, the wiper positioned to contact the belt along the return path to scrape excess spread from the belt.

The present invention further relates to an apparatus for applying a spread onto a food item. The apparatus includes an applicating station for applying a pre-selected quantity of the spread onto the food item as the food item is moved therethrough. The apparatus also includes a pumping station for transporting the spread to the applicating station. The apparatus further includes a conveyor belt for transporting the food items through the applicating station. The apparatus additionally includes an applicating roller rotatably supported within the applicating station and positioned over said conveyor belt for applying the spread onto the food item passing thereunder. Finally, the apparatus includes a t-shaped nozzle positioned within the applicating station and in fluid communication with the pumping station, the t-shaped nozzle including a dispensing bar extending along at least a portion of the applicating roller whereby the spread supplied by the pumping station exits the dispensing bar and contacts the applicating roller.

The present invention further relates to an apparatus for transporting items. The apparatus includes a frame. The apparatus further includes an endless conveyor belt supported by the frame. A first portion of the belt travels through a transportation path and a second portion of the belt travels through a return path. The apparatus additionally includes a height adjustment assembly in rotational contact with the belt along the transportation path. In turn, the assembly includes a height adjustment roller in rotating contact with the belt. The roller is movable in a direction substantially perpendicular to the belt and is rotatably supported on opposing sides of the frame. The assembly further includes a first pair of gears, the first pair of gears supported by the frame and rotatable with respect to the frame about a first axis located in the substantial center of each of the first gears. Finally, the roller rotates about a second axis on each of the gears, the second axis being located at a pre-selected distance from the first axis whereby rotation of the first gears simultaneously moves the roller in the perpendicular direction.

Finally, the present invention relates to a method for applying a spread packaged in a container onto a food item. The method includes the steps of providing an applicating station for applying a pre-selected quantity of the spread onto the food item as the food item is moved therethrough, providing a pumping station in fluid communication with the applicating station for transporting the spread from the container to the applicating station, pumping the spread from the container to the applicating station, and diverting at least a portion of the spread exiting the pumping station into the container for agitation of the spread.

As a result, the present invention provides an apparatus which is capable of slicing a selected food item and thereafter applying a pre-selected spread thereon. The present invention may be both readily operated and cleaned, and provides the ability to handle viscous spreads. The present invention also provides improved control of the quantity of spread applied to the food item, as well as improved guiding of the food item into the cutting instrument. The present invention also provides a lever-actuated assembly to release tension in the belt, as well as a belt-height adjustment mechanism. The present invention also provides an improved means for collecting excess spread from the belt. Finally, the present invention provides an improved means of evenly distributing the spread across the applicating roller.

BRIEF DESCRIPTION OF THE DRAWINGS

FIGS. 10 and 10a are details of a wheel included in the belt tensioning/release assembly of the present invention.

DETAILED DESCRIPTION OF THE INVENTION

Figure 1:
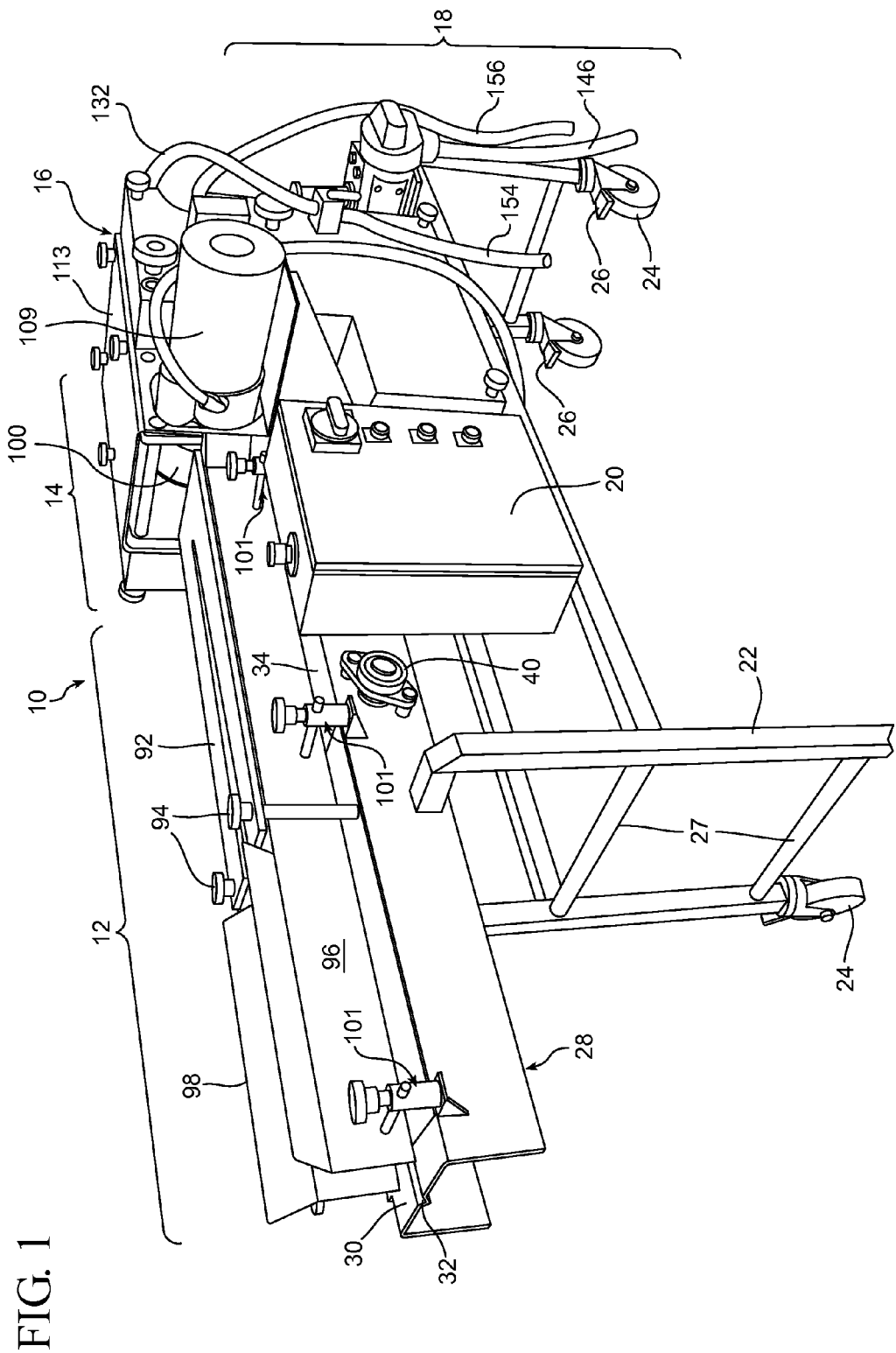
FIG. 1 is a front perspective view of the slicing and spread-applicating apparatus of the present invention.
Figure 2:
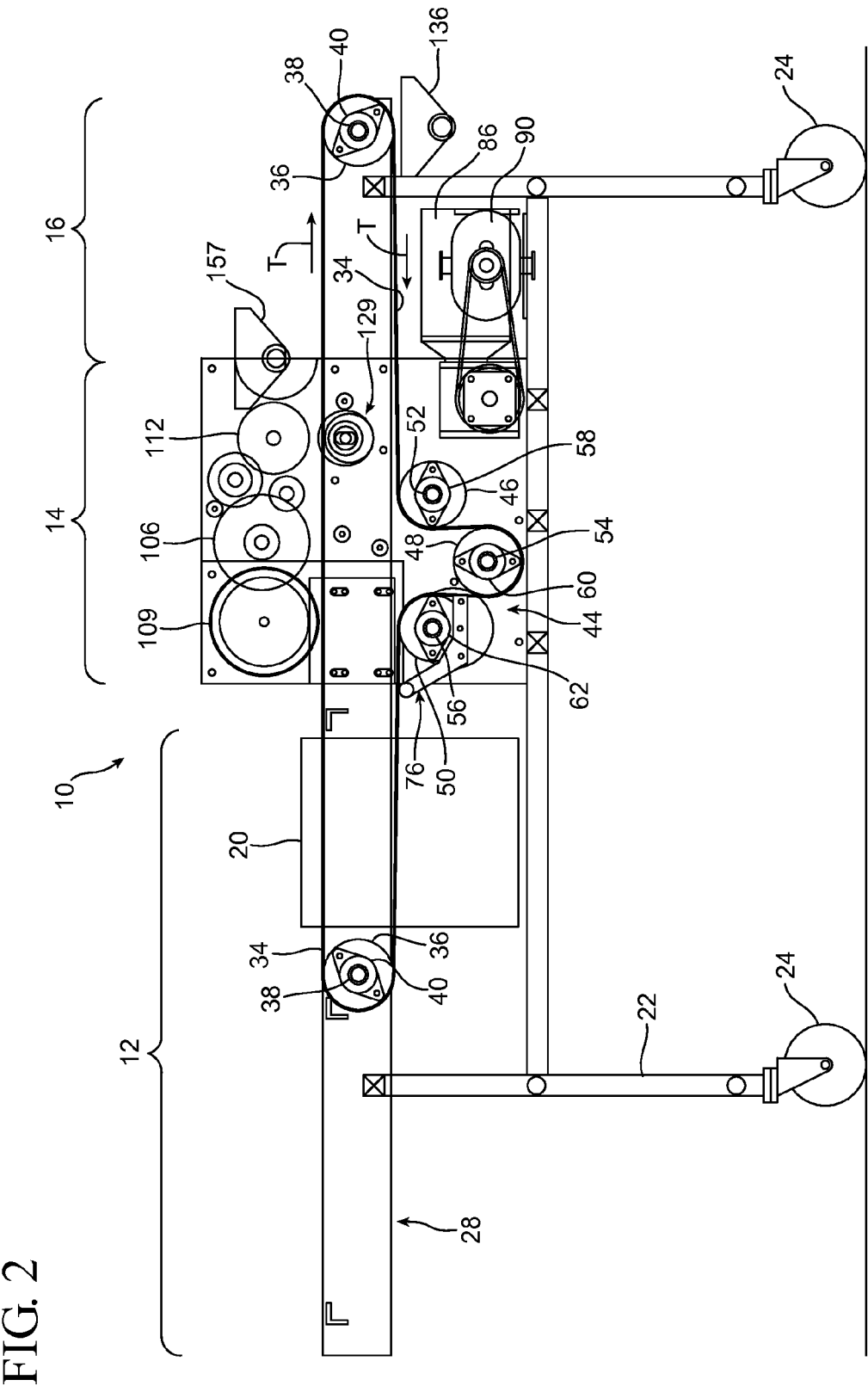
FIG. 2 is an elevational view of the apparatus of FIG. 1.
Figure 3:
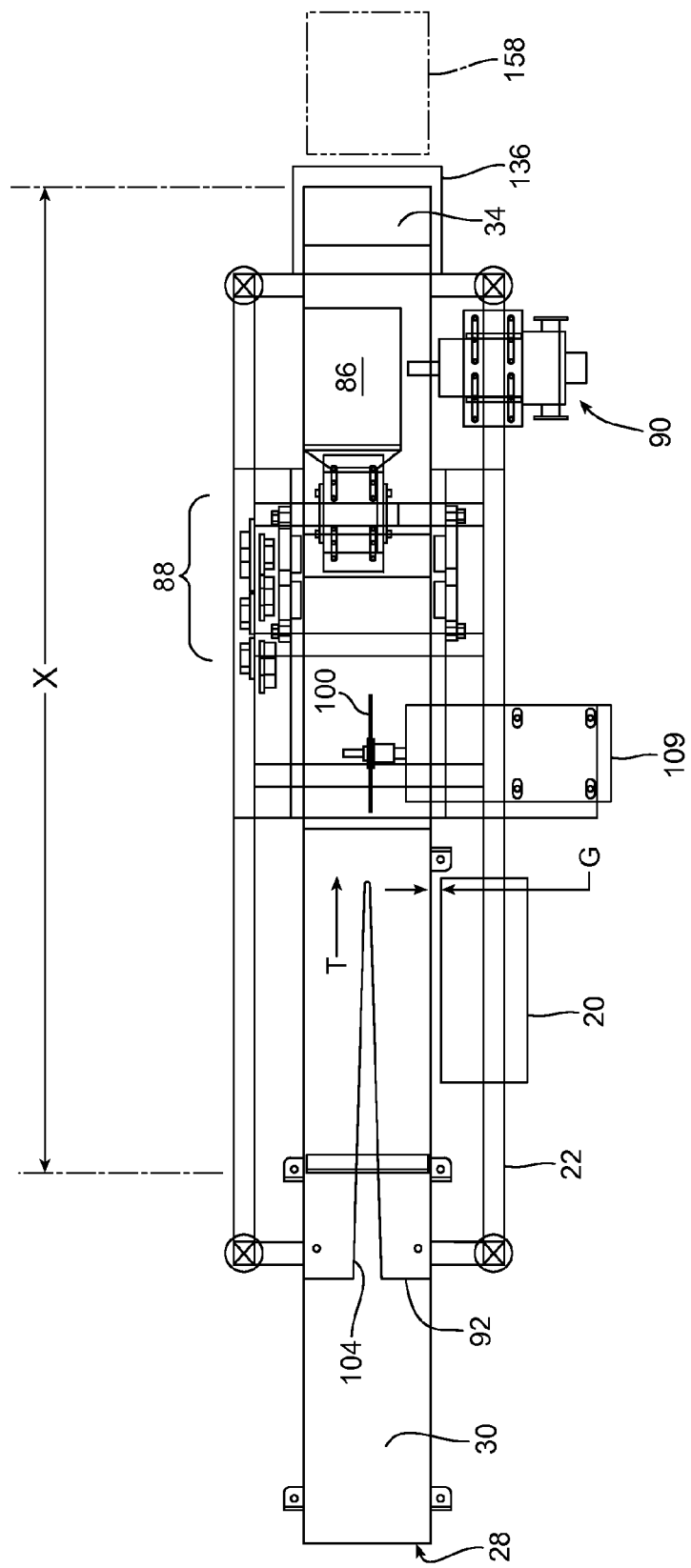
FIG. 3 is a plan view of the apparatus of FIG. 1.

Slicing and spread-applicating apparatus 10 is shown in FIGS. 1-3. Apparatus 10 generally includes a feeding section 12, a slicing-splitting-applicating section 14, a discharge section 16, a pumping station 18 and a control panel 20. These components, which will be discussed hereinbelow in detail, may be mounted to and/or supported upon a frame 22. In one preferred embodiment, frame 22 is supported by a plurality of wheels 24, thus allowing apparatus 10 to be readily moved. Once located, apparatus 10 may be fixed in position via a plurality of locking levers 26 located on wheels 24.

Alternatively, the components of apparatus 12 could be mounted on a fixed member or structure other than frame 22. For example, the components of apparatus 10 could be part of a larger machine or processing system. In addition, the mentioned components could be independently supported and/or mounted to distinct structures. In one preferred embodiment, frame 22 includes cylindrical cross-members 27 which tend to limit build-up of bacteria/contaminants thereon.

As best shown in FIGS. 2 and 3, support member 28, which provides a support surface 30, preferably extends the entire length of apparatus 10. In one preferred embodiment, support member 28 is formed with a U-shaped cross-section with provides rigidity to the member while also providing locations for attachment of frame 22 thereto.

Figure 4:
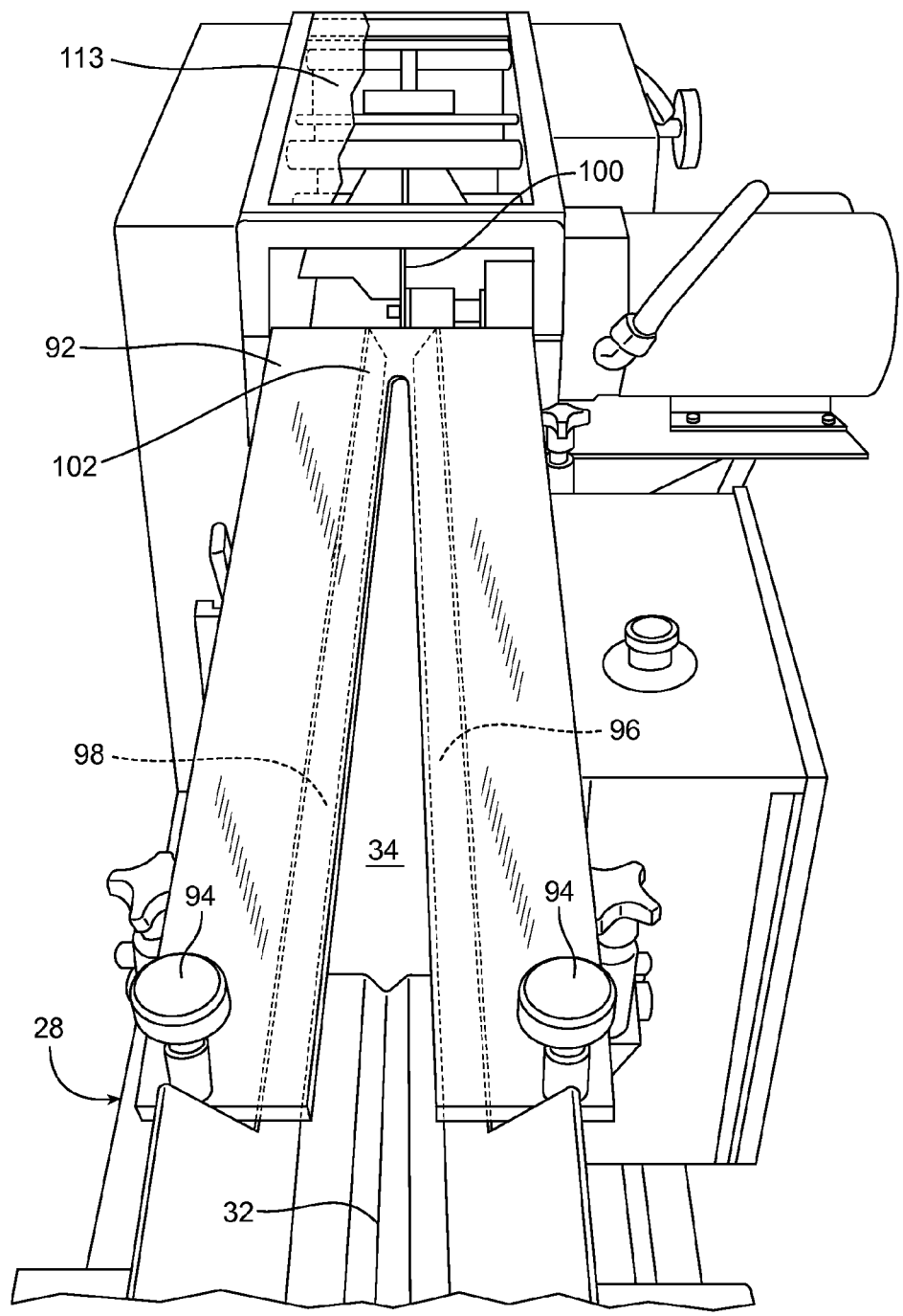
FIG. 4 is a top perspective view of the apparatus of FIG. 1.

As best shown in FIG. 4, member 28 preferably includes a centrally-disposed groove 32 extending along the entire length. An endless conveyor belt 34, which extends a distance X along apparatus 10, preferably includes a centrally-disposed rib 35 on its bottom surface extending in the direction of travel (see FIG. 9). This rib engages groove 32, and facilitates the tracking of the belt. In the portion of the feeding section which is upstream of the conveyor belt, the length of exposed groove facilitates the tracking of the food item being fed into the machine. For example, groove 32 will tend to "cradle" a loaf of bread as it is fed into the feeding section of the apparatus.

Figure 5:
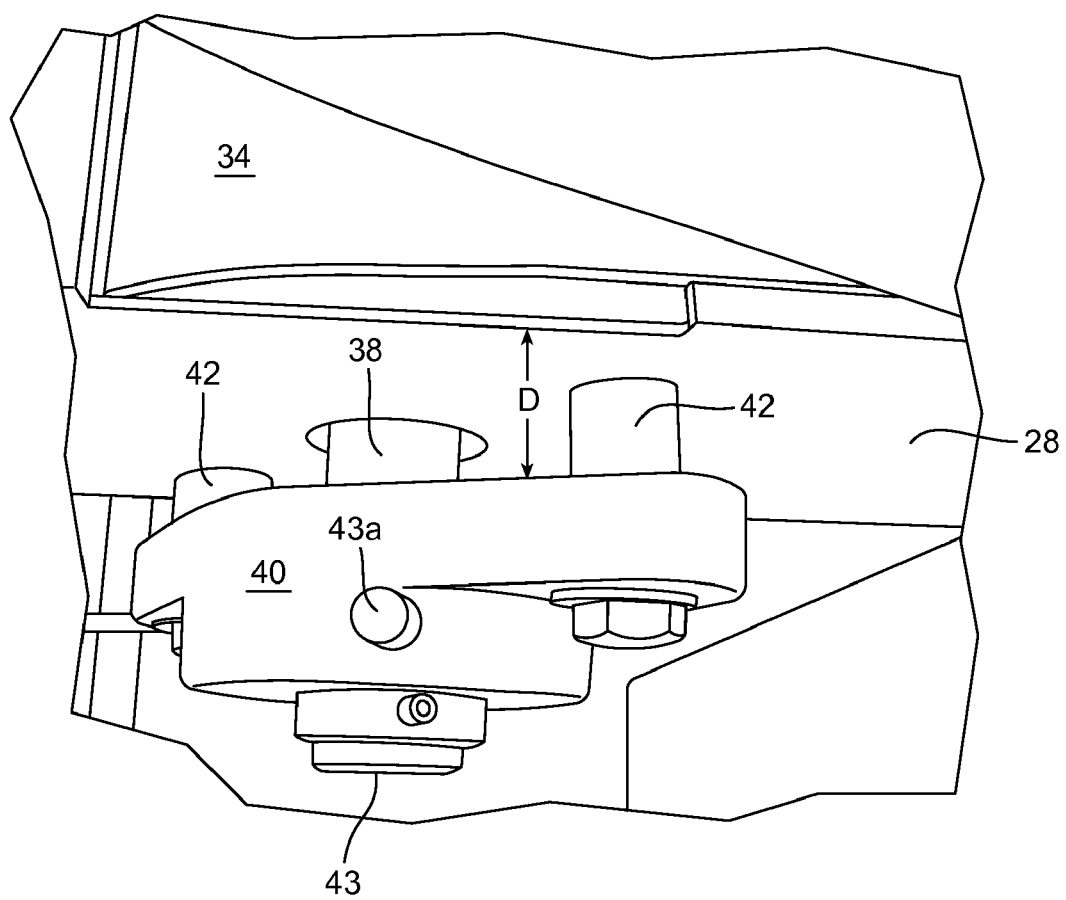
FIG. 5 is an enlarged detail of a bearing which supports the shaft at one end of the conveyor belt.

Conveyor belt 34 is rotatably supported at opposing ends via a roller 36, which rotates about a shaft 38 (see FIG. 2). Shaft 38 preferably extends through the sidewall of support member 28, and is rotatably supported at each side of member 28 by a bearing 40. As best shown in FIG. 5, shaft 38 extends through the sidewall of support member 28 and extends within bearing 40. In this regard, the present invention utilizes a pair of standoffs 42 which space bearing 40 a distance D from the sidewall of support member 28. As a result, the area between the sidewall of support member 28 and the back surface of bearing 40 may be readily cleaned during washdown of the apparatus, thus reducing/minimizing the build-up of bacteria or other such contaminants at this location. Moreover, the body of the bearing is provided with a cap 43 to eliminate/reduce the loss of lubrication during washdown of the apparatus. In addition, a cap 43a is installed over the grease fitting for the bearing. The use of such caps also increases the overall cleanliness of the apparatus.

Referring to FIG. 2, apparatus 10 preferably includes a belt tensioning/release assembly 44 for both tensioning the conveyor belt during operation and for loosening the belt during maintenance and/or cleaning of the apparatus. Assembly 44 preferably includes rollers 46, 48 and 50 rotatably supported on shafts 52, 54 and 56. In turn, shafts 52, 54 and 56 are rotatably supported at opposing ends by a pair of bearings 58, 60, 62, respectively. The belt, which travels in the direction of arrow T, first contacts roller 46, then passes around roller 48, and finally contacts roller 50.

Figure 6:
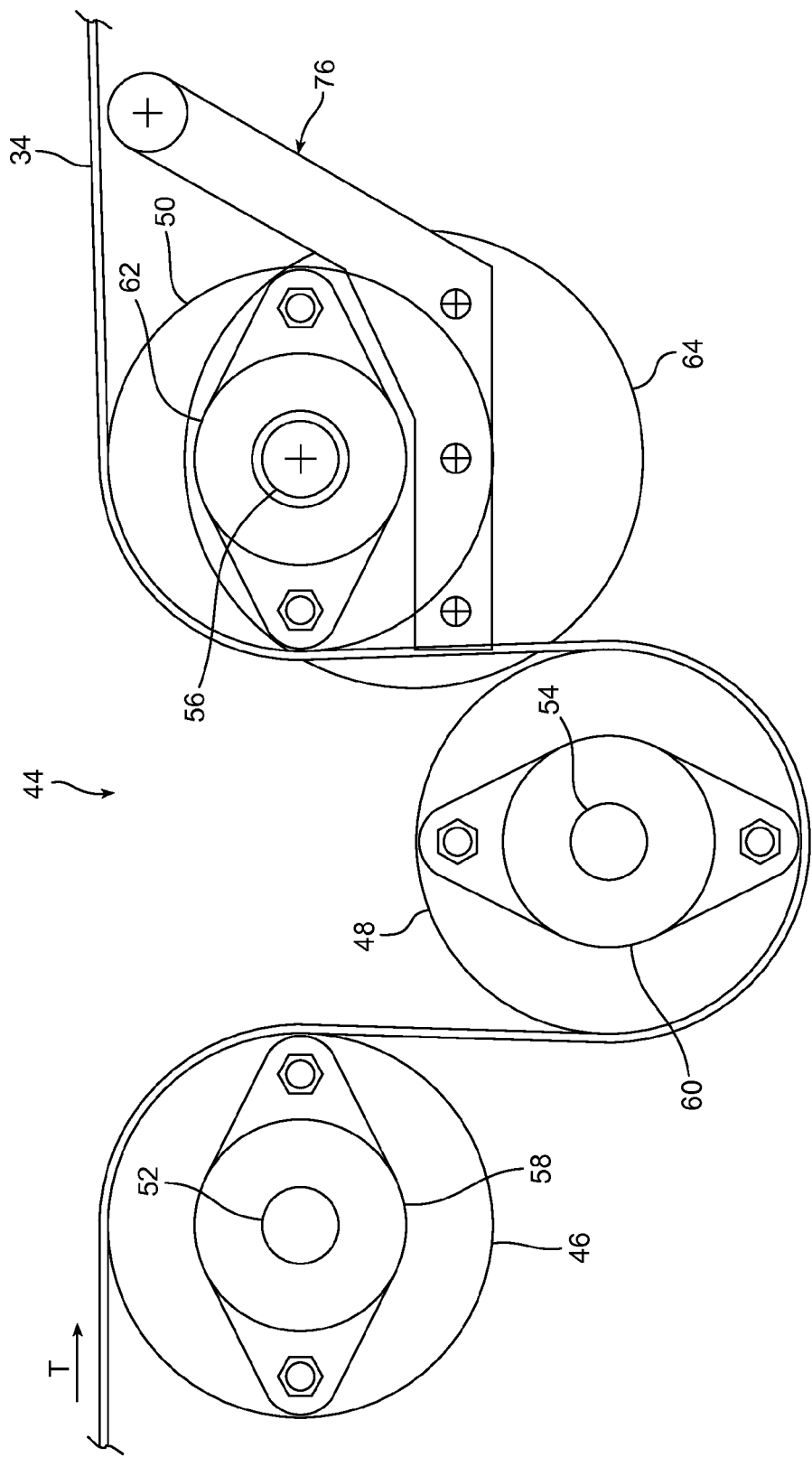
FIG. 6 is a partial elevational view of the belt tensioning/release assembly in a tensioned position.
Figure 7:
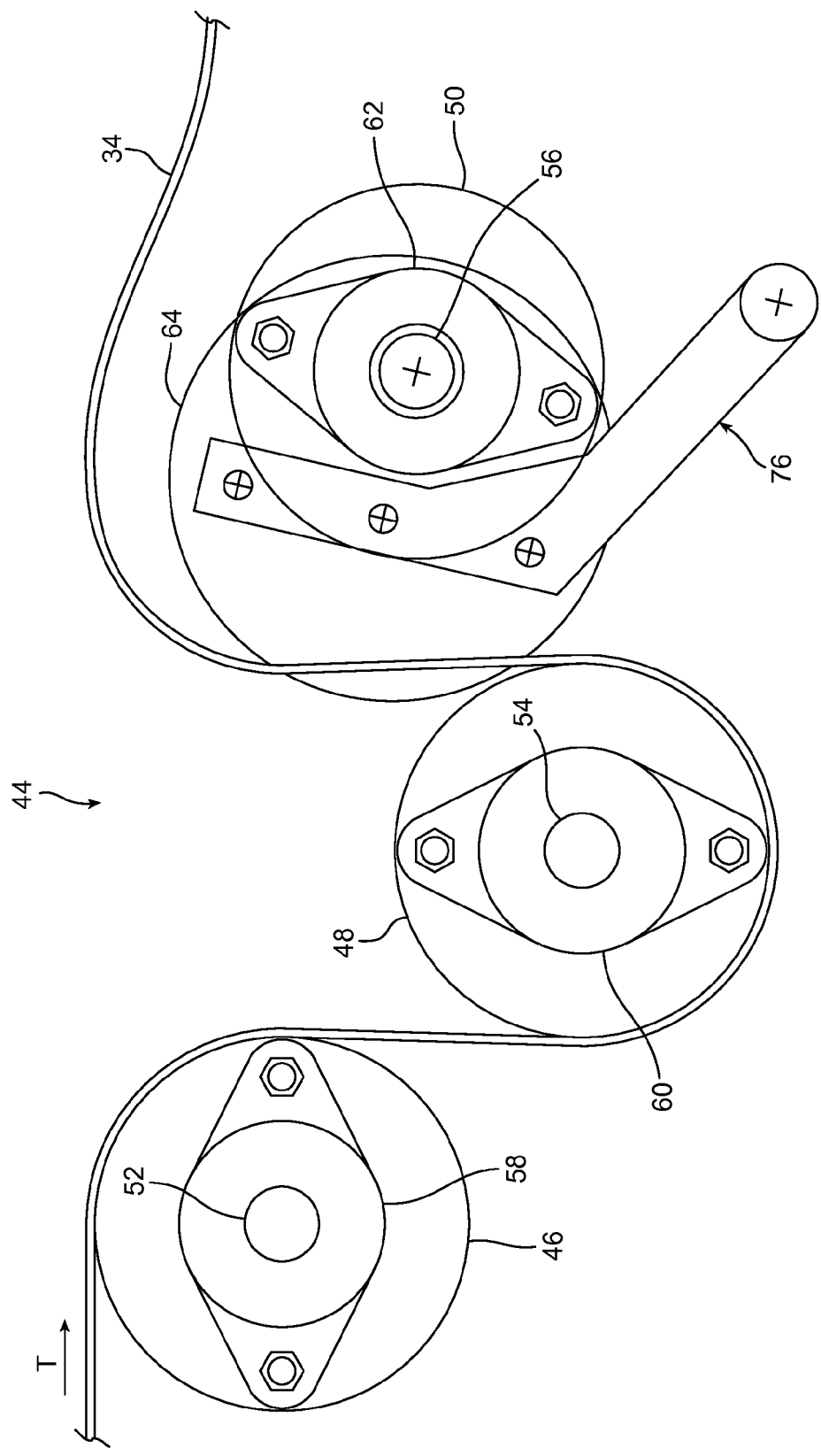
FIG. 7 is a partial elevational view of the belt tensioning/release assembly in a non-tensioned position.

Enlarged details of belt tensioning/release assembly 44 are shown in FIGS. 6 and 7 (as viewed from the opposite side of FIG. 2). In particular, FIG. 6 shows the assembly in its operating (i.e., tensioned) position, while FIG. 7 shows the assembly in its non-operating (i.e., non-tensioned) position. As noted, in the non-operating position, the portion of the belt downstream of roller 50 (i.e., the portion furthest to the right) is slackened.

Figure 8:
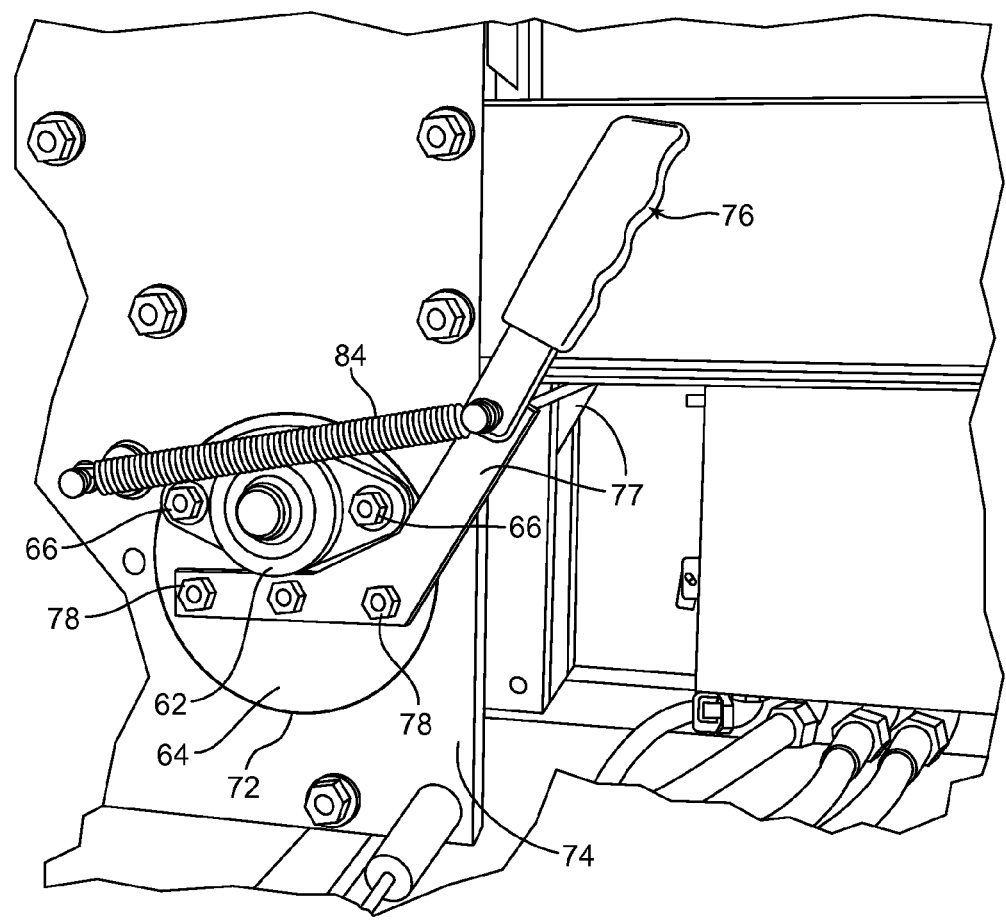
FIG. 8 is a detail of the belt tensioning/release assembly in the tensioned position.

In particular, assembly 44 is designed to allow one-handed operation, without the need for tools and/or the need to disassemble components, to tension and/or loosen the belt. In particular, bearing 62, which supports shaft 56 upon which roller 58 rotates, is in turn secured to a wheel 64 located on opposing sides of apparatus 10 (see FIGS. 8-9). Wheel 64 is shown in detail in FIGS. 10 and 10A. In particular, bolts 66, which pass through bearing 62, extend through apertures 68 in wheel 64. Likewise, shaft 56 passes through aperture 70 formed in wheel 64. Wheel 64 is rotatably supported within circular groove 72 formed within wall 74. In turn, wheel 64 is rotatable within groove 72 about center C. A handle mechanism including opposing brackets 77 is secured to wheel 64 via bolts 78, which pass through apertures 80 in wheel 64. It will be appreciated by those skilled in the art that clockwise rotation of wheel 64 (via clockwise movement of handle mechanism 76) causes clockwise rotation of shaft 56 about center C. As a result of the rotation of shaft 56 about center C, roller 50 is moved from the tensioned position shown in FIG. 6 to the untensioned position shown in FIG. 7.

Figure 9:
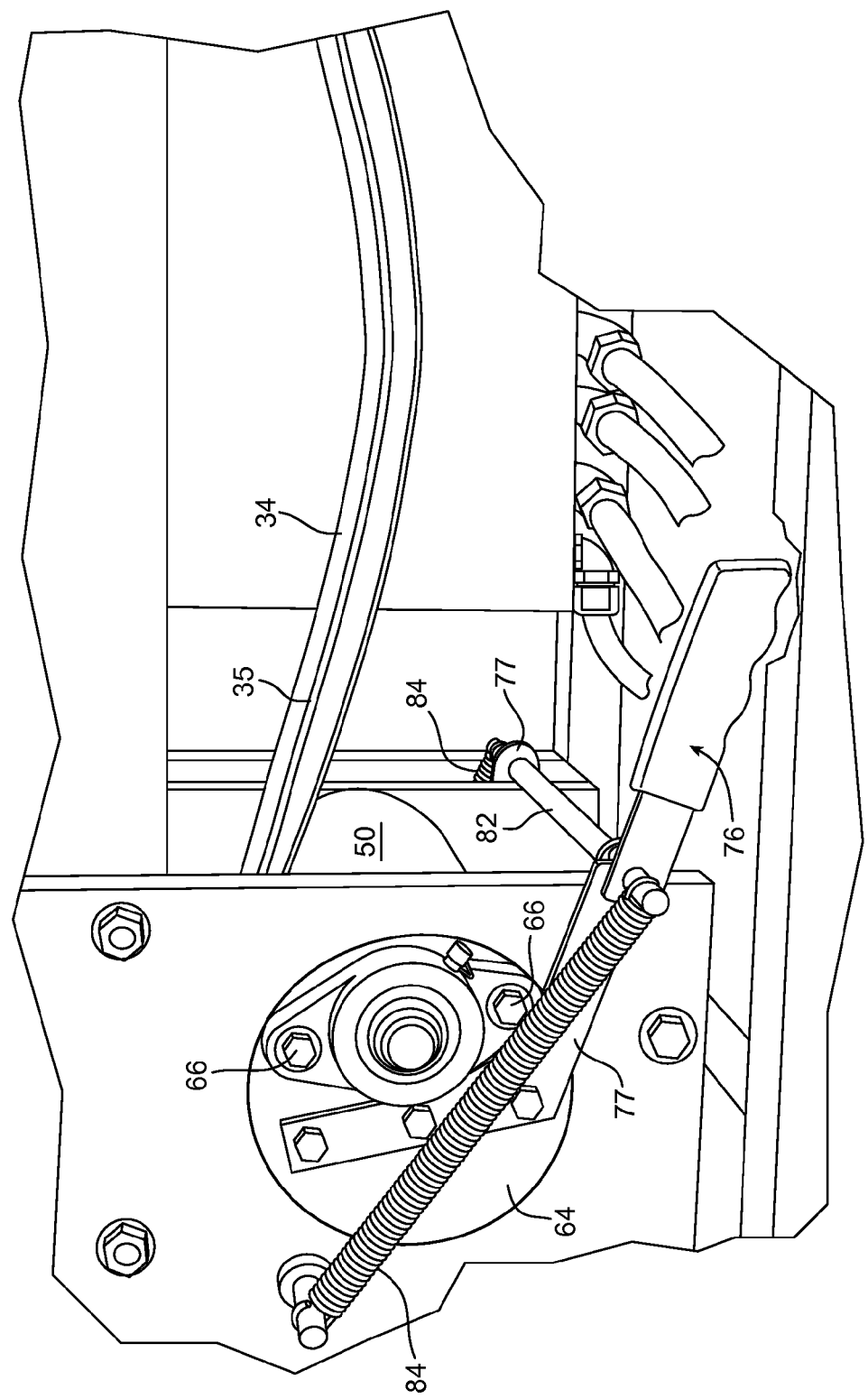
FIG. 9 is detail of the belt tensioning/release assembly in the non-tensioned position.

As seen in FIG. 9, a rod 82 may be used to interconnect the opposing brackets 77, while a pair of springs 84 are preferably used to provide continuous tension to handle mechanism 76 while in the operating (i.e., tensioned) position. Of course, springs 84 must be located such that handle mechanism 76 will remain in the non-operating (i.e., non-tensioned) position when moved into such position.

Referring back to FIG. 3, apparatus 10 includes a motor 86 for powering a drive belt assembly 88, which in turn powers conveyor belt 34. In one preferred embodiment, rotational movement is imparted to the conveyor belt through shaft 54 and roller 48. As described further hereinbelow, the rotational output of motor 86 may also be used to drive a pump 90. Alternatively, a plurality of motors may be used to drive the various components of apparatus 10.

In this regard, such components are preferably designed and/or configured so that the surface speed of the individual components contacting the food item have a constant velocity. Stated differently, if the individual components do not contact the food item (e.g., a loaf of bread) at the same surface velocity, the item may be stretched and/or pulled apart.

Control panel 20, as shown in FIG. 1, includes the electronic controls for operating apparatus 10, as well as electronics for preventing operation of the machine in response to signals from various emergency shut-off switches and guarding proximity sensors positioned around the apparatus. For example, apparatus 10 may include sensors which prevent operation of the machine if certain safety guides and/or shields are removed. Control panel 20, as well as the operating knobs, are preferably sealed to prevent ingress of water during washdown of the apparatus. Similar to bearings 38, control panel 20 is preferably spaced a distance G from the sidewalls of support member 28. This allows the space between the back surface of the control panel 20 and the sidewall of support member 28 to be cleaned (thus preventing build-up of bacteria and/or other contaminates).

Referring now to feeding section 12 of apparatus 10, a substantial portion of such length proximate to slicing-splitting-applicating section 14 (which contains a rotating blade) is covered by a safety shield 92. Although shield 92 is shown in FIGS. 1 and 4 as a planar member extending in a plane generally parallel to conveyor belt 34, shield 92 may also be configured with a U-shaped cross-section wherein the sidewalls of such shield extend down towards frame 28 (thereby preventing side access into this region). As shown, safety shield 92 is preferably secured to frame 28 via a plurality of knobs 94. Apparatus 10 preferably includes various proximity sensors which will disable the machine when shield 92 is removed.

Figure 11:
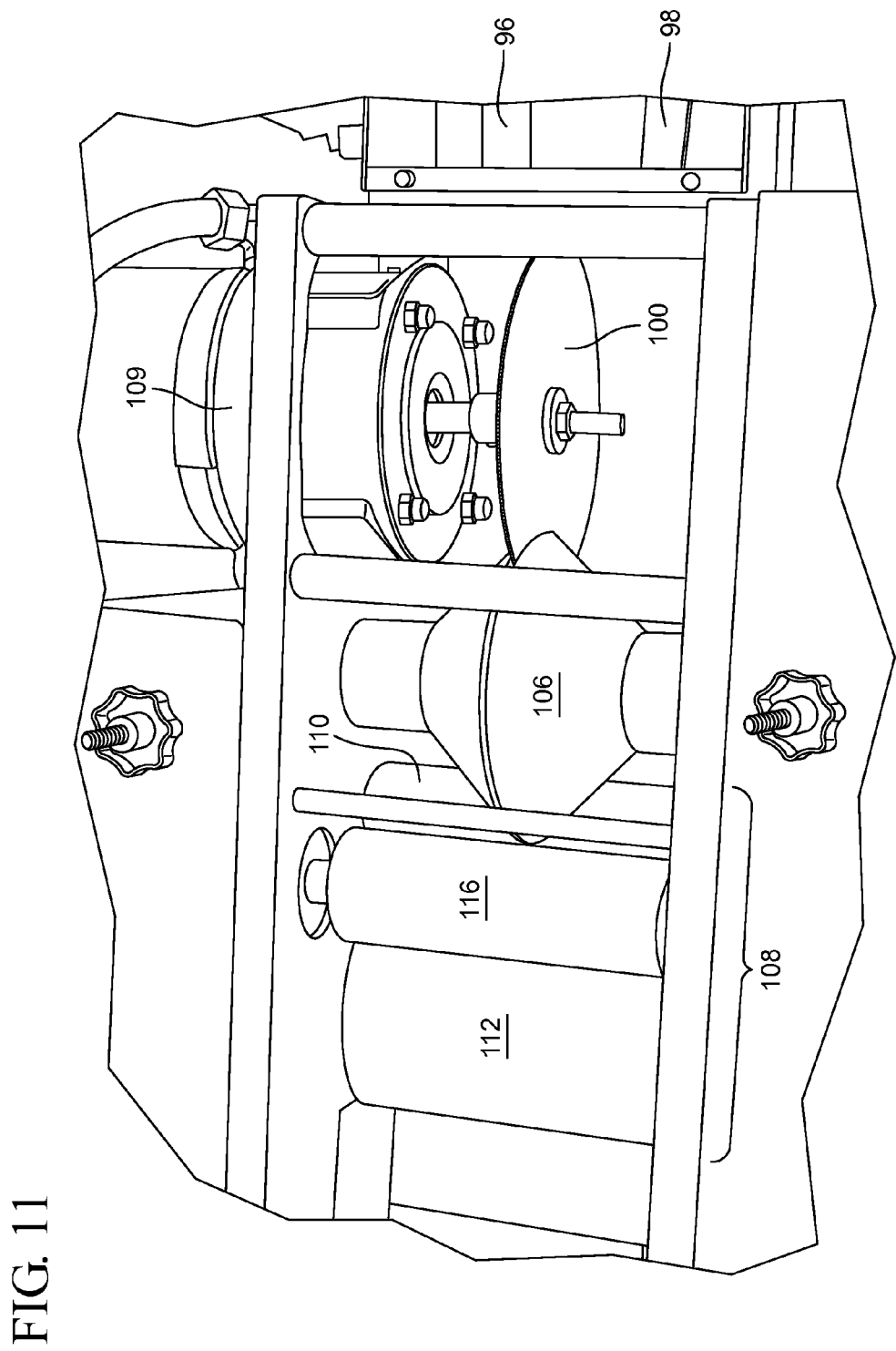
FIG. 11 is a top perspective view of the slicing-splitting-applicating section of the present invention.

Feeding section 12 preferably includes a pair of opposing guides, i.e., fixed guide 96 and spring guide 98. As best shown in FIG. 11, fixed guide 96 locates and fixes the position of the guides with respect to slicing blade 100. Spring guide 98 serves to push the food item, e.g., the loaf of bread, against the fixed guide as it travels along the conveyor belt towards blade 100. The location of the guards with respect to blade 100, as well as the distance therebetween, is preferably adjustable via a plurality of adjustable locating arms 101 (see FIG. 1). In one preferred embodiment, spring guard 98 is formed from a continuous length of metal which is secured to frame 28 in a manner which tends to urge distal end 102 toward fixed guard 96. Of course, it is contemplated herein that spring guard 98 could utilize springs or other such structure for urging such guide toward fixed guide 96.

As a result, the guides provide consistent feeding of the food item (e.g., a loaf of bread) into the slicing-spreading-applicating section of the apparatus. In one preferred embodiment, guides 96, 98 are provided with a dimpled surface which limits sticking of the food product to the walls of such guides due to moisture and/or characteristics of the product itself. Stated differently, the walls of the guides should allow the food item to travel therepast without sticking and/or binding. In addition, safety shield 92 includes a slot 104 which facilitates the loading of the food item onto conveyor belt 34.

Referring now to slicing/splitting/applicating section 14, this section of apparatus 10 is responsible for first slicing the food product via blade 100, splitting the food item into two halves via splitter 106 and applying a spread to the food item via spreading assembly 108. In detail, blade 100 is turned by a motor 109 and is fixed with respect to guide 96 so that the food item is sliced at the proper location, i.e., through its center. Blade 100 preferably includes a height adjustment to control the cutting depth of the blade. More particularly, it is often times desirable not to cut entirely through the food item, thereby leaving a portion of material which functions as a hinge. This hinge serves to keep the two halves of the item together as the item travels through the remaining length of apparatus 10. Once sliced by blade 100, the two halves of the item are opened by splitter 106, whereby the two halves of such item are positioned side by side (connected by the hinge of non-sliced material) with both newly-exposed surfaces directed upward. The food item then passes below roller 110 and into contact with applicating roller 112. A safety shield 113, covers section 14 during operation. Preferably, at least one proximity sensor or other such relay is provided on section 14 to disable the apparatus when shield 113 is removed.

Figure 12:
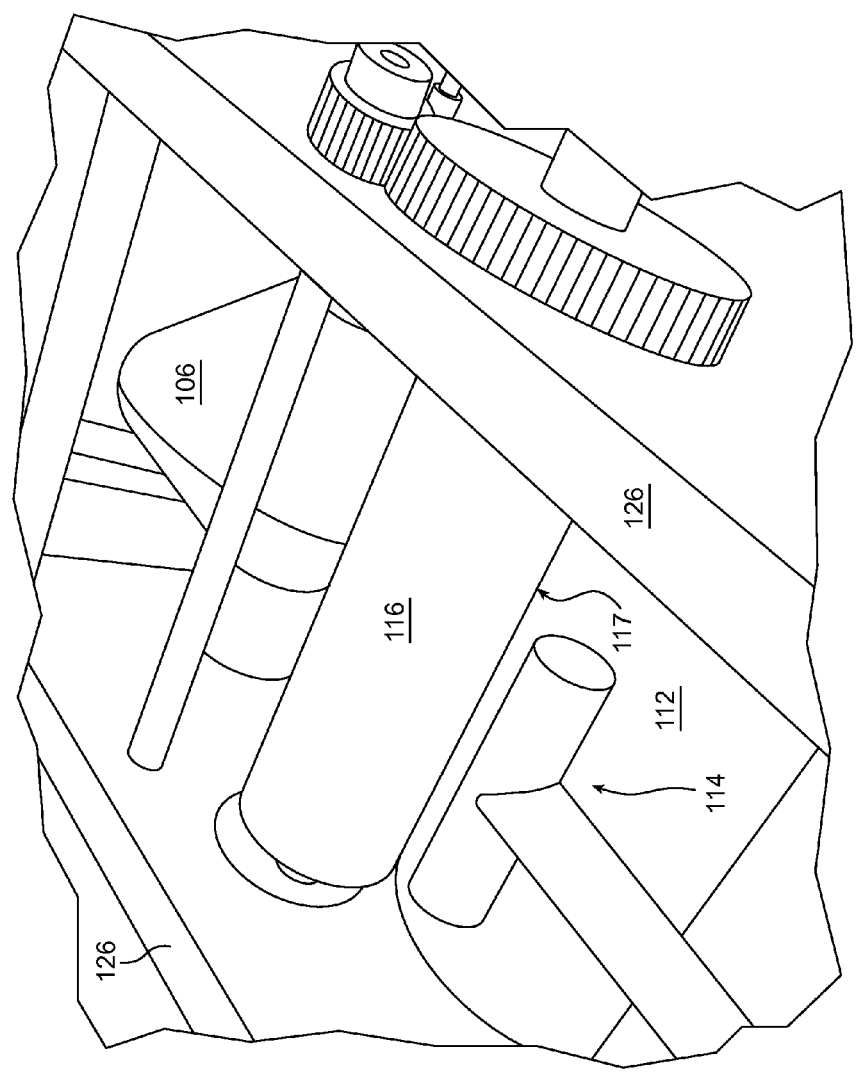
FIG. 12 is a top perspective view of the slicing-splitting-applicating section showing the spread-control roller at a minimum spread position.
Figure 13:
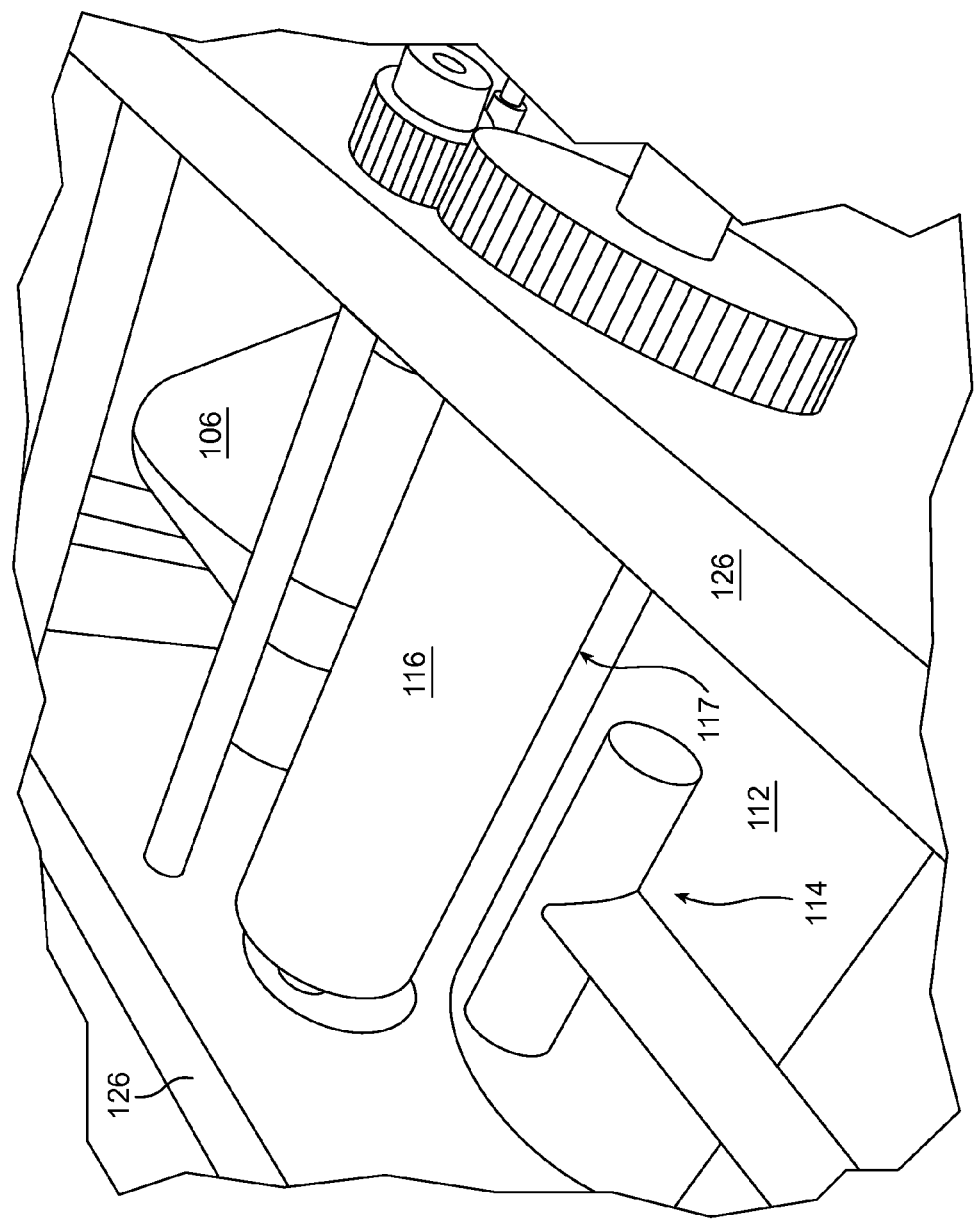
FIG. 13 is a top perspective view of the slicing-splitting-applicating section showing the spread-control roller in a maximum spread position.

Referring now to FIG. 12, the spread to be applied to the food item is deposited onto roller 112 via a t-shaped nozzle 114. The rotation of roller 112 causes the spread to move towards a spread-control roller 116. The position of roller 116 with respect to roller 112 is preferably adjustable, and defines an application gap 117 therebetween. Roller 116 is shown in its closest position to roller 112 in FIG. 12, while it is shown in its most distant position from roller 112 in FIG. 13. It will be appreciated by those skilled in the art that the adjustability of roller 116 allows the quantity and thickness of the spread being applied to the food item to be readily and accurately adjusted. In fact, those skilled in the art will recognize that the spread control adjustability described herein provides finer and more accurate control of the spread as compared to known prior art processes and techniques, particularly with respect to thicker, more viscous spreads.

Figure 14:
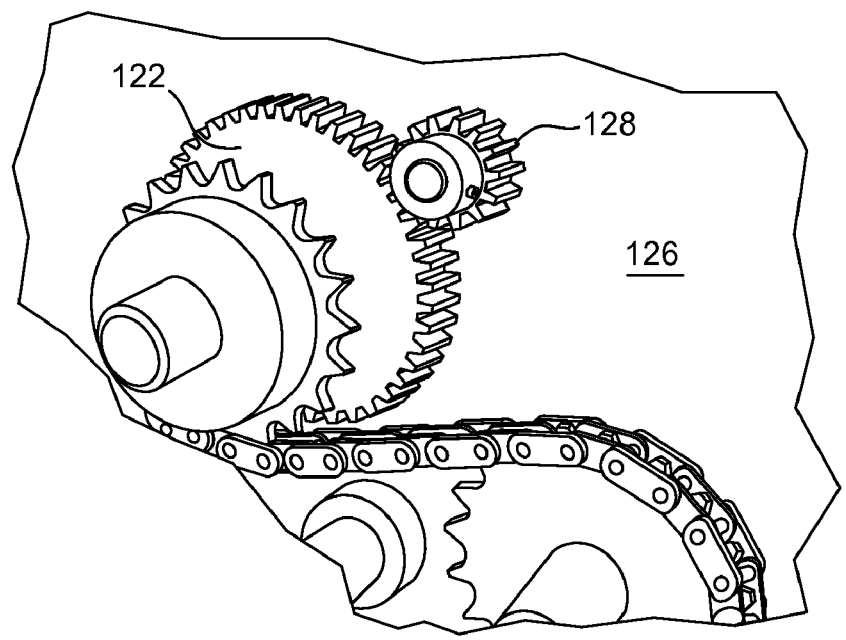
FIG. 14 is an enlarged detail showing the location of the components which operate the spread-control roller when the spread-control roller is in the minimum spread position.
Figure 15:
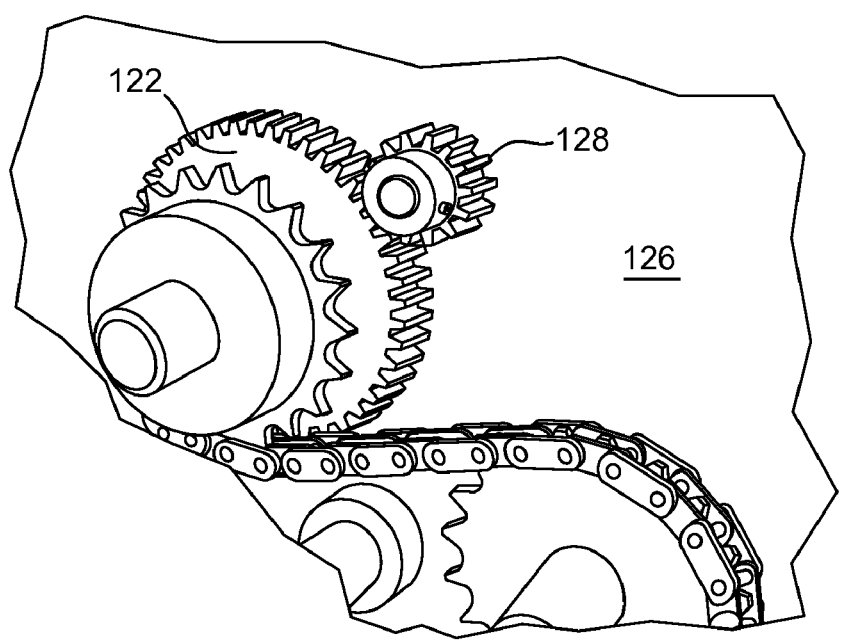
FIG. 15 is an enlarged detail showing the location of the components which operate the spread-control roller when the spread-control roller is in the maximum spread position.
Figure 16:
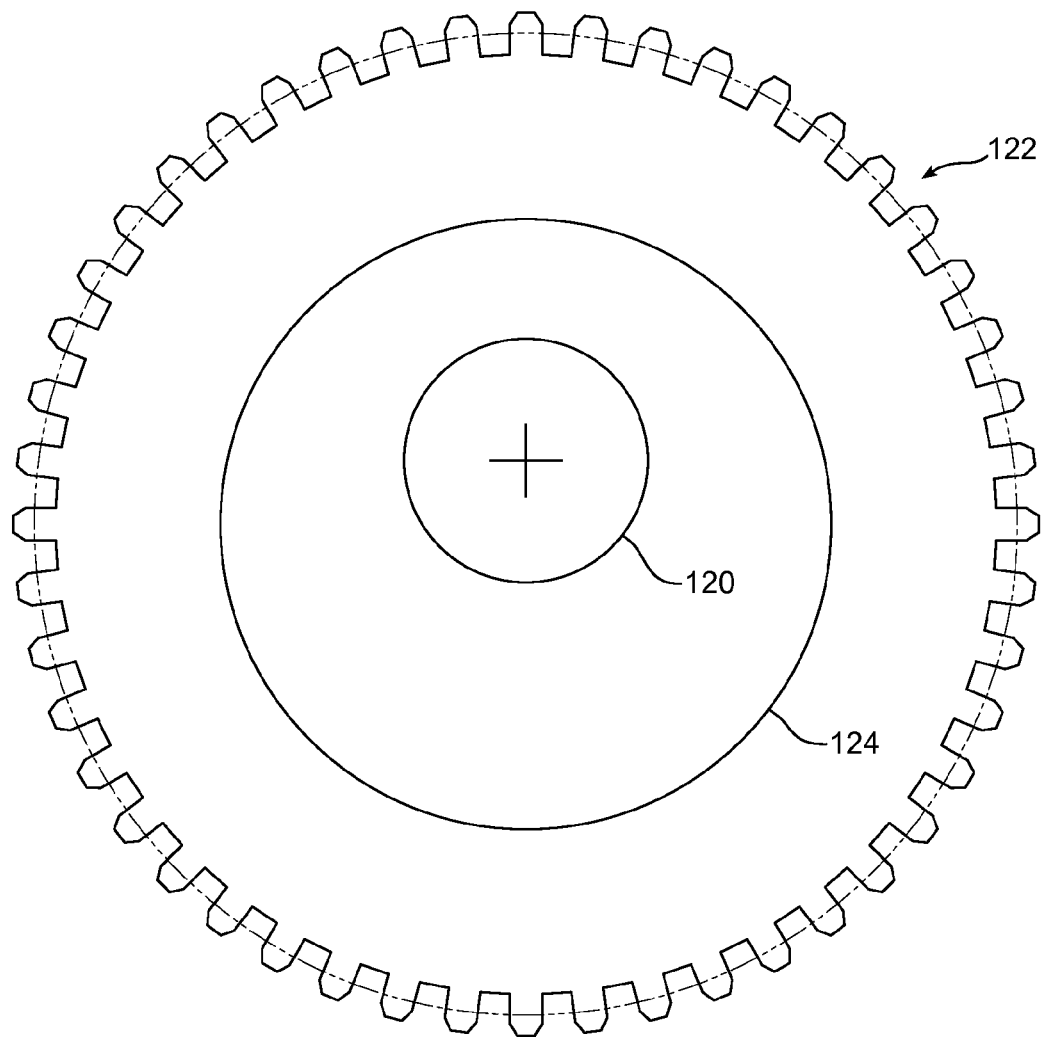
FIG. 16 is an enlarged detail of the gear which moves the spread-control roller.

Referring to FIGS. 14-16, roller 116 is supported by a shaft (not shown) extending therethrough, which in turn is rotatably supported by aperture 120 of control gear 122. The shaft is preferably maintained in position by a pair of collars (not shown). If desired and/or necessary, a bearing could be used to support the ends of shaft, such bearing being attached to the outer side of gear 122 (similar to the location of bearing 62 on wheel 64). Gear 122 preferably includes a hub 124, which is rotatably supported by walls 126 of section 14. Thus, as adjustment gear 128 is rotated, gear 122 is rotated about the center of hub 124. Because the shaft which supports roller 116 is off center with respect to the center of hub 124, the rotation of gear 122 causes roller 116 to move with respect to roller 112.

Figure 16A:
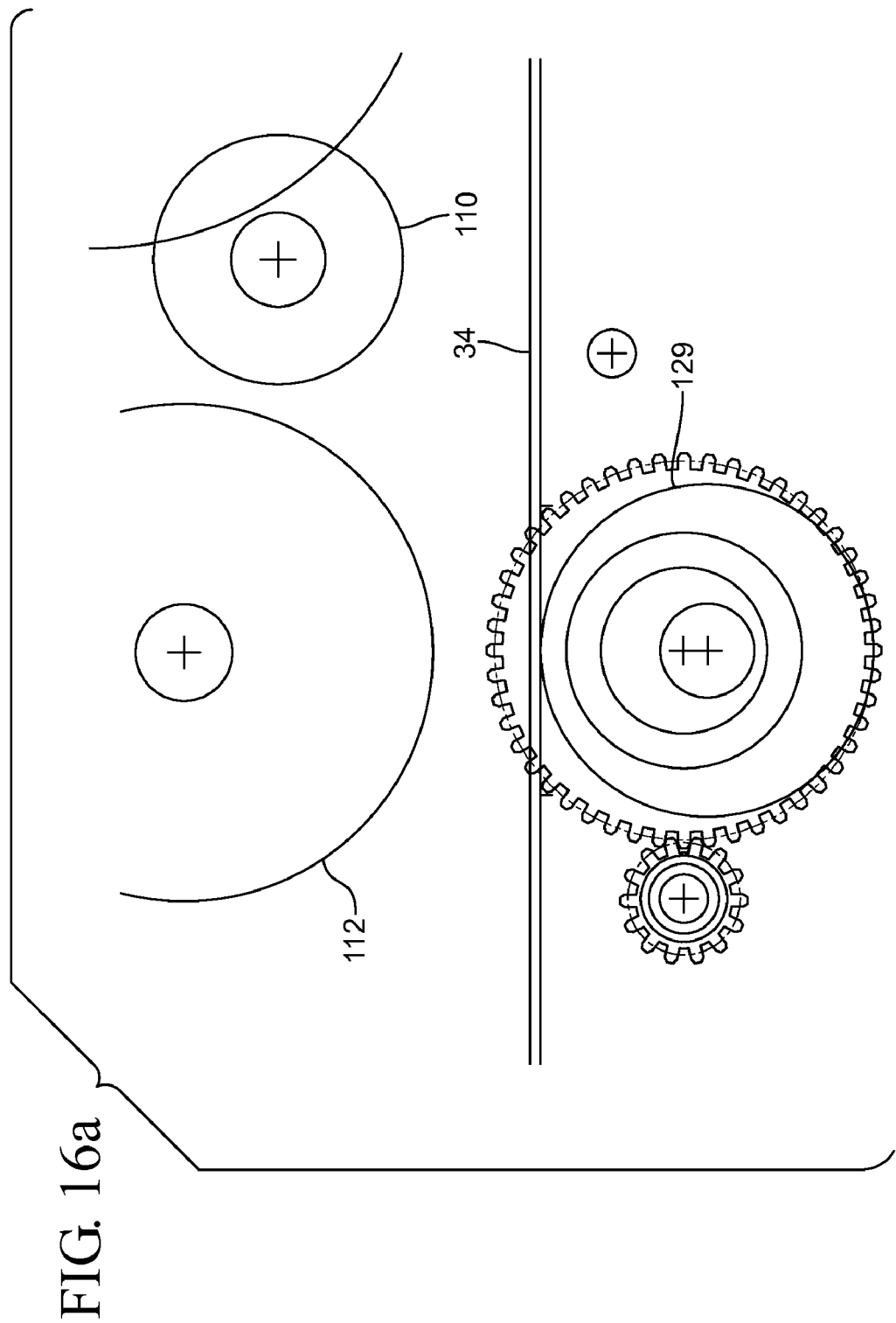
FIG. 16a is a partial elevation view of the belt height adjustment roller in its lower-most portion.
Figure 16B:
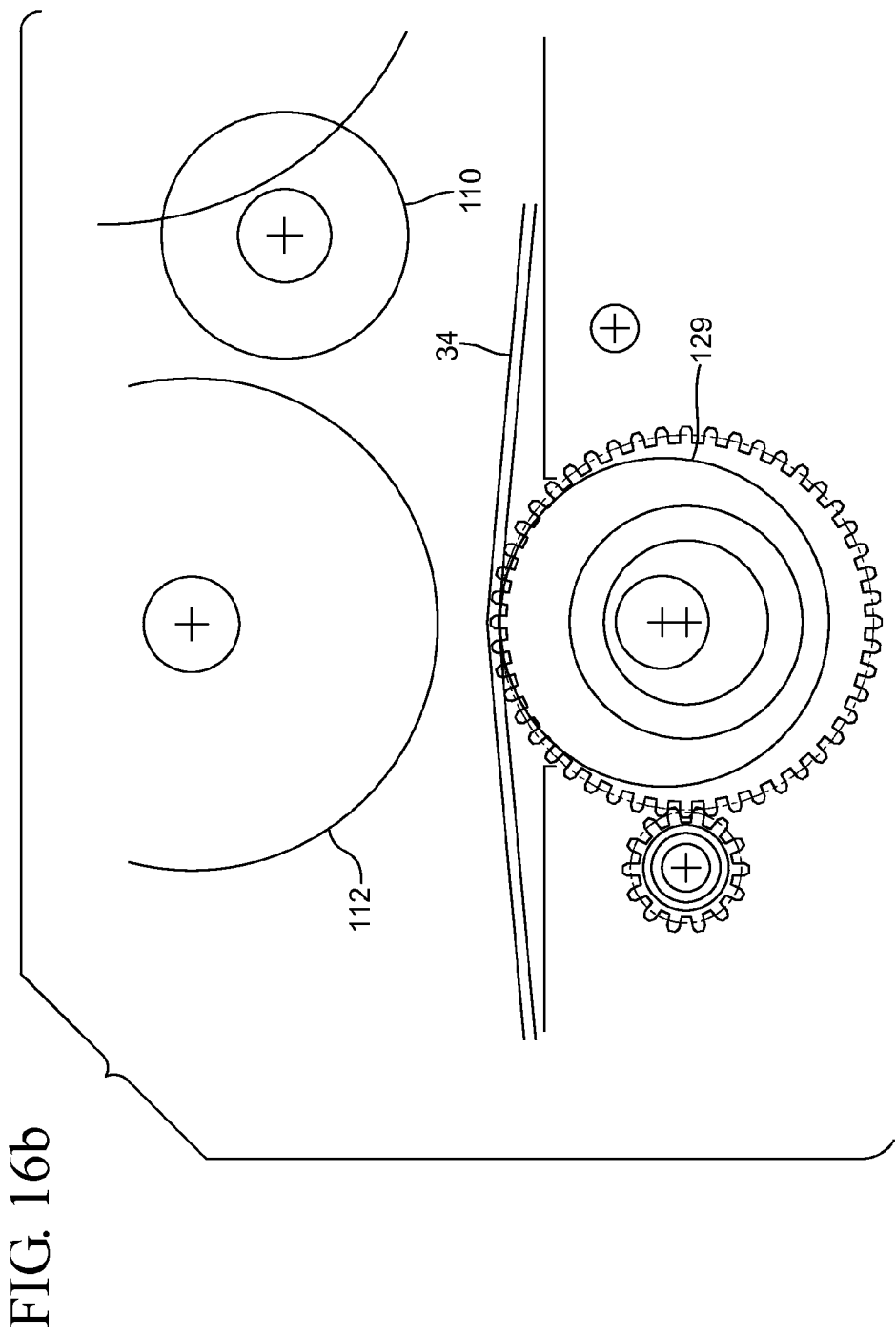
FIG. 16b is a partial elevation view of the belt height adjustment roller in its upper-most portion.

Referring back to FIG. 2, apparatus 10 preferably includes a belt height adjustment roller 129 located below roller 112. Roller 129 is thus positioned to control the height of the belt under spread-applying roller 112 whereby the apparatus can be adjusted to account for variations in the thickness of the food item. In this regard, FIG. 16a illustrates the location of belt 34 when adjustment roller 129 is in its lower-most position, while FIG. 16b illustrates the location of belt 34 when adjustment roller 129 is in its upper-most position. Belt height adjustment roller 129 is preferably designed and configured in the same fashion as adjustable roller 116, i.e., it utilizes gears 122 and 128 to move roller 129 toward/away from roller 112.

Figure 17:
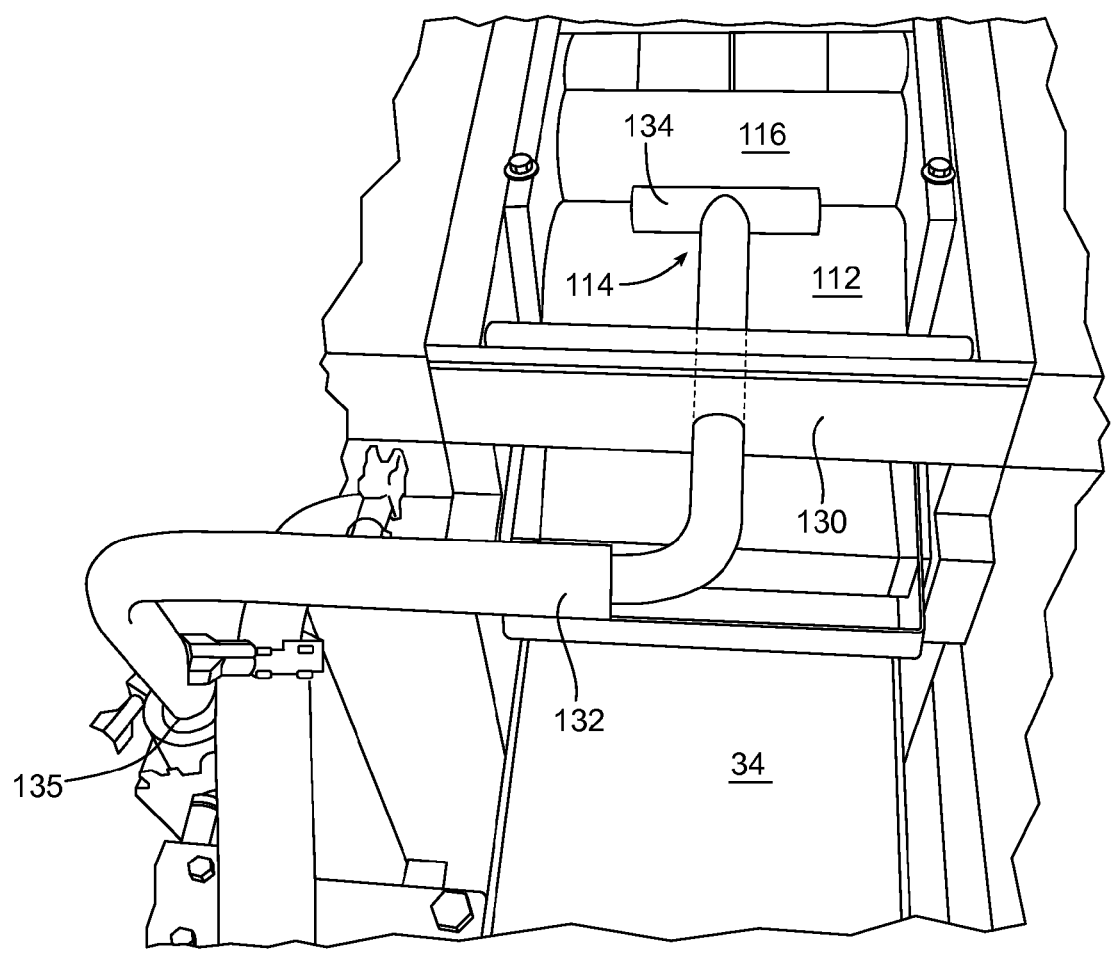
FIG. 17 is a top perspective view of the fluid duct and t-shaped nozzle which provide the spread to the applicating roller.

Referring now to FIG. 17, t-shaped nozzle 114 is preferably supported by a plate 130 which may be removably secured to walls 126. T-shaped nozzle 114 is in fluid communication with fluid duct 132. The duct may be formed from a metal pipe, plastic tubing, or a combination of both. The duct preferably has a large diameter, preferably greater than ¾ inches, and more preferably about 1 inch or greater in diameter. The larger diameter facilitates the movement of the various spreads therethrough, particularly the thicker, more viscous spreads. T-shaped nozzle 114 includes a dispensing bar 134 which extends in the same direction as roller 112. It is contemplated herein that dispensing bar 134 can be of varying lengths, e.g., it can in some applications extend substantially the entire length of roller 112 to facilitate even distribution of the spread across the roller. A continuous slot (not shown) extends across the bottom of dispensing bar 134. Alternatively, discontinuous slots and/or apertures could be formed across the bottom of dispensing bar 134. In an additional embodiment, dispensing bar 134 is removed to allow spread to be delivered directly from duct 132 onto roller 112. Preferably, the various components (e.g., ducts, dispensing bar, etc.) are connected together using quick-disconnect fittings 135 which allow ready disassembly of the components for cleaning.

Figure 18:
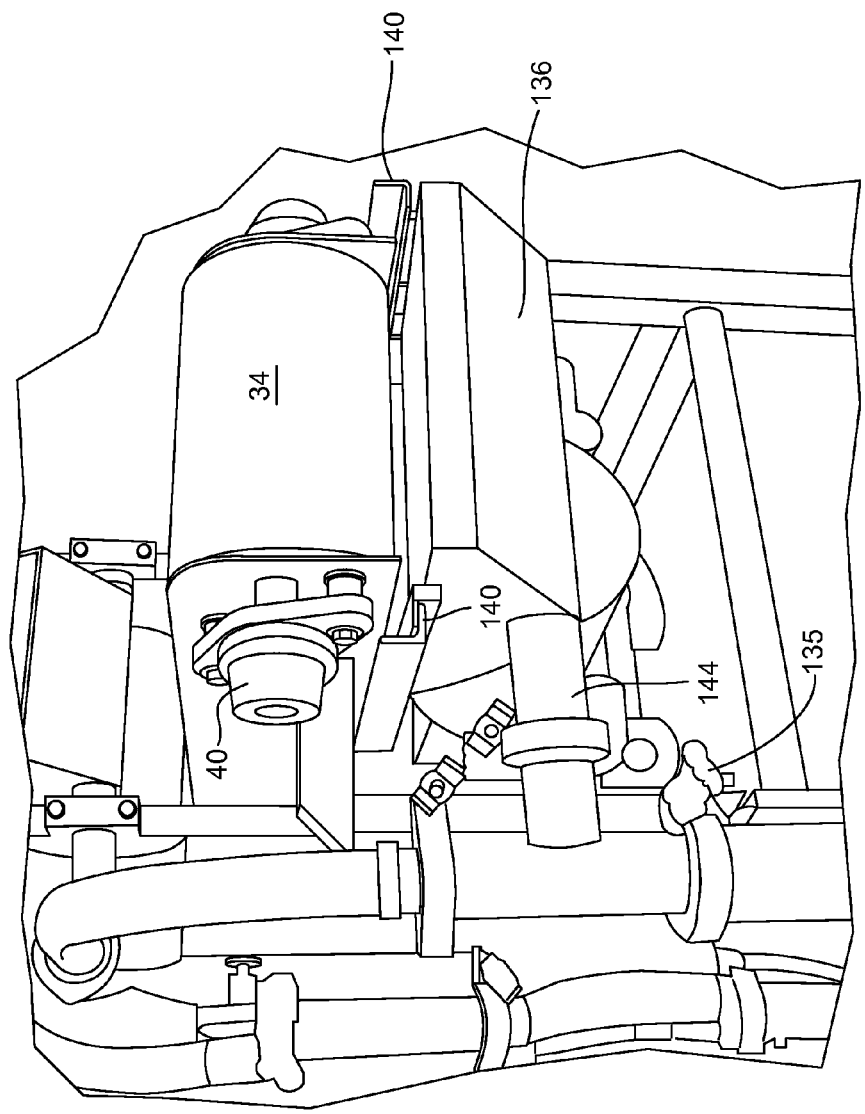
FIG. 18 is a perspective view of a basin which collects excess spread dripping from the belt.
Figure 19:
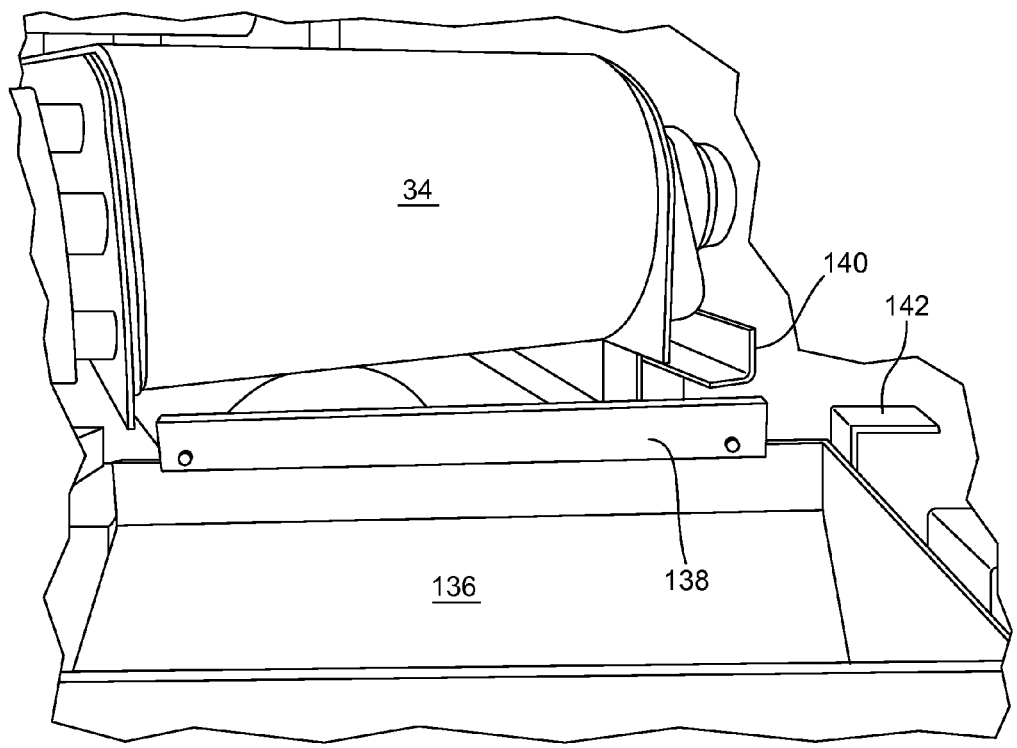
FIG. 19 is an enlarged detail of the basin showing a wiper which extends across the conveyor belt.

Referring now to FIGS. 18-19, apparatus 10 includes a lower collection basin 136 located at the forward-most end of apparatus 10. Basin 136 is positioned to catch any spread which inadvertently contacts the belt. In this regard, a continuous wiper 138 is located along one edge of basin 136. The wiper extends across the entire length of belt 34 (see FIG. 19) and remains in contact therewith during operation of the apparatus. It will be appreciated by those skilled in the art that any spread contacting the belt will be scraped clean of the belt via wiper 138, and thereafter drain into basin 136. This cleaning/drying of the conveyor belt greatly enhances the overall cleanliness of the apparatus, particular because the belt is cleaned prior to the belt contacting rollers 46, 48 and 50. Moreover, the cleaning/drying of the belt facilitates the feeding of food products into the apparatus. It will be appreciated by those skilled in the art that any spread located on the conveyor belt will contact the outside surfaces of the food item while it travels along feeding section 12. This can hinder continuous movement of the bread through this section of the machine, and can also place spread on undesirable locations of the food item.

In one preferred embodiment, basin 136 is supported on a pair of opposing tracks 140 via a plurality of hanging elements 142. Basin 136 is preferably configured with a V-shaped cross-section whereby spread will drain to the center of the basin. A drainage duct 144 is connected to the basin at this lower-most region. Of course, it is contemplated herein that basin 136 may be configured differently to enhance the collection of different types of spreads. For example, a thicker, more viscous spread may require more severe angling of the bottom of the basin and/or a continuous drainage slot extending across the width of the basin.

As mentioned hereinabove, apparatus 10 includes pumping station 18. Pumping station 18 includes pump 90. In one preferred embodiment, pump 90 is a constant volume pump.

As mentioned above, pump 90 may be operated via the same motor which operates the drive mechanism of the apparatus. Alternatively, pump 90 can be independently powered. It is also contemplated herein that other types of pumps (other than constant volume pumps) could be utilized in this application.

Figure 20:
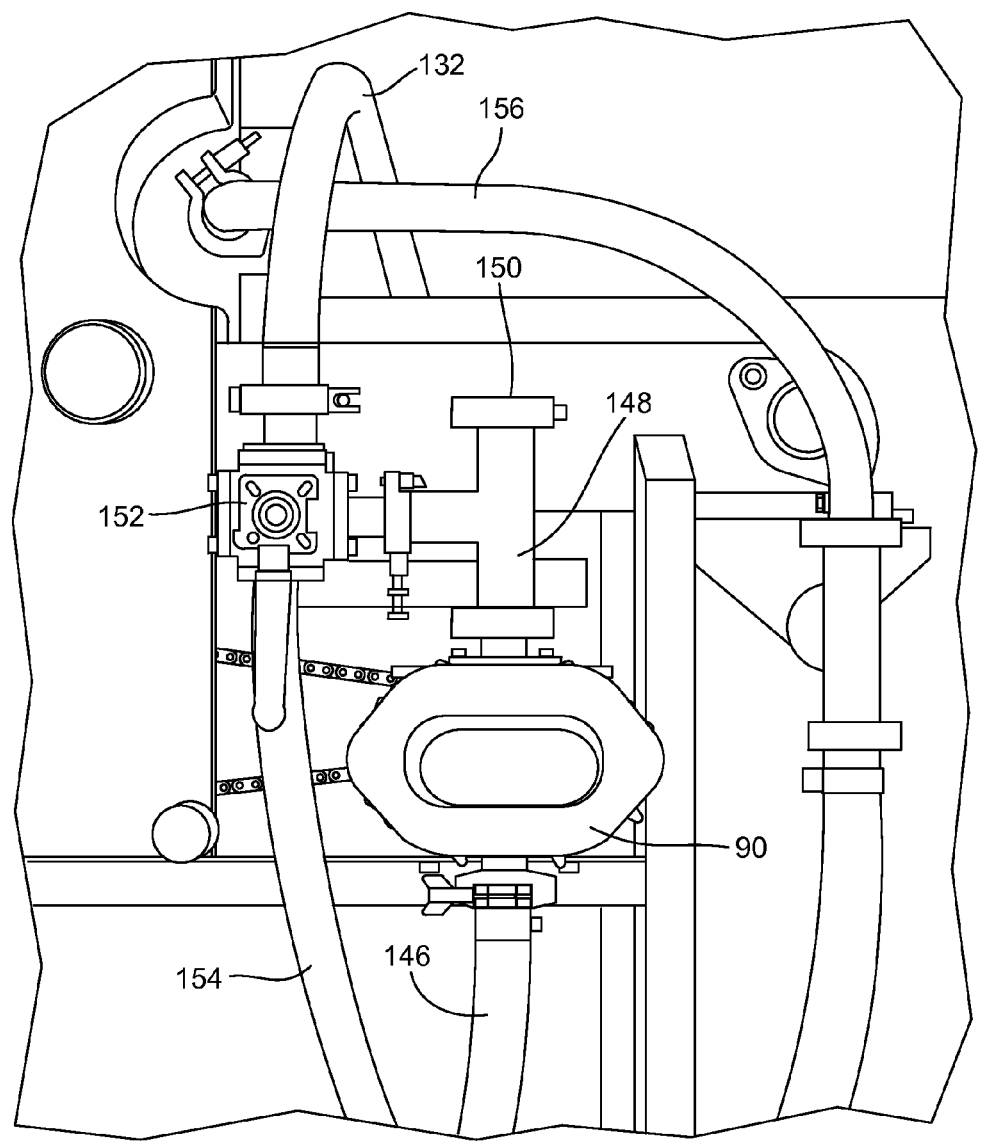
FIG. 20 is an enlarged elevational view of the pumping station of the present invention.

As best shown in FIG. 20, station 118 includes an intake duct 146 whereby spread can be drawn out of a container (e.g., a five gallon pail) and drawn upward into pump 90. An output duct 148 is located on the output side of pump 90. Output duct 148 may be configured to include a priming port 150 which allows the pump to be primed with spread at startup. As shown, output duct 148 feeds a diverter, e.g., constant flow diverting valve 152, which is configured to meet the requirements of station 18. In particular, it will be recognized by those skilled in the art that the output side of a constant volume pump can not be restricted during operation.

When the pump is operating, the spread will be directed into valve 152 and upward into fluid duct 132. Typically, only a portion of the flow traveling through output duct 148 is required by spreading assembly 108. Thus, at least a portion of the spread outputted by pump 90 is directed through diverting valve 152 into return duct 154. Preferably, return duct 154 is in communication with the spread being drawn upwards by intake duct 146. It has been discovered herein that the usage of a return duct 154 providing a continuous delivery of spread into the container holding the spread causes loosening/agitation of the spread within the container, thus facilitating the drawing of such spread into pump 90. Those skilled in the art will recognize that the application of thick, viscous spreads could otherwise prove difficult.

Because the output side of pump 90 can not be restricted because of the design of such pump, diverting valve 152 must be designed such that substantially 100% of flow is continuously passed therethrough. More particularly, 100% of the flow can be directed into fluid duct 132, or 100% of the flow can be directed into return duct 154. However, as diverting valve 152 is moved between these two extreme positions, the sum of the combination of flows should remain substantially equal to 100% of the pump output. For example, adjustment of the flow control valve could vary the flow from 100%-0% (fluid duct/return duct) to 80%-20% (fluid duct/return duct) to 40%-60% (fluid duct/return duct) to 0%-100% (fluid duct/return duct). In this way, the output side of pump 90 remains unrestricted. In one preferred embodiment, the movable ball of a diverting valve is designed and/or configured to provide a constant flow of fluid therepast (independent of the position of the ball). Finally, pumping station 18 may include an upper drainage duct 156 for allowing drainage of excess spread from inside of section 14. In this regard, an upper collection basin 157 (see FIG. 2) positioned within section 14 collects excess spread from roller 112.

It is contemplated herein that a folding apparatus 158, as represented in FIG. 3, may be located at the downstream end of apparatus 10, whereby the food item (having been sliced, opened and flavored) can be refolded about the hinge coupling the two halves to facilitate packaging of the item. The term spread as used herein is understood to include coatings such as butter, margarine, garlic or other seasonings, cream cheese, or any other toppings which have a viscosity which allows such coating to be delivered via pump station 18. In certain applications involving particularly thick, viscous coatings, an alternative delivery system (other than pumping station 18) may be used to deliver the coating onto roller 112. It will be recognized by those skilled in the art that apparatus 10 is particularly suitable for slicing of food items, such as loaves of bread, particularly Italian-style bread, bagels, rolls and other such flour-derived or baked food items.

While various embodiments of the present invention are specifically illustrated and/or described herein, it will be appreciated that modifications and variations of the present invention may be effected by those skilled in the art without departing from the spirit and intended scope of the invention.

What is claimed is:

1. An apparatus for applying a spread packaged in a container onto a food item, comprising:
   an applicating station for applying a pre-selected quantity of said spread onto said food item as said food item is moved therethrough;
   a pumping station in fluid communication with said applicating station for transporting said spread from said container to said applicating station; and
   wherein said pumping station includes
      a pump having an input and an output, said input arranged in fluid communication with said container to provide access to said spread; and
      a diverter positioned downstream of said pump, said diverter including a flow control valve for adjustably directing spread between said applicating station and said container, said flow control valve including first and second outputs;
      a first duct extending between said first output of said flow control valve and said applicating station; and
      a second duct extending between said second output of said flow control valve and said container whereby at least a portion of said spread exiting said pump may be diverted into said container for agitation of said spread.

2. The apparatus according to claim 1, wherein said flow control valve includes a movable ball that provides a constant flow of fluid therepast independent of the positioning of said flow control valve whereby the flow into said flow control valve substantially equals the sum of all outputs from said flow control valve throughout the range of operation of said flow control valve.

3. The apparatus according to claim 2, wherein said pump provides a constant output volume; and
   further comprising a motor for powering said pump.

4. The apparatus according to claim 1, wherein said pump includes a priming port for initial priming of said pump.

5. The apparatus according to claim 4, further comprising:
   a duct extending between said input of said pump and said container; and
   a duct extending between said output of said pump and said flow control valve, and wherein said priming port is located between said output and said valve and positioned at a higher elevation than said pump to allow priming of said pump.

6. An apparatus for applying a spread packaged in a container onto a food item, comprising:
   an applicating station for applying a pre-selected quantity of said spread onto said food item as said food item is moved therethrough;
   a pumping station in fluid communication with said applicating station for transporting said spread from said container to said applicating station; and
   wherein said applicating station includes
      a conveyor belt for transporting said food item therethrough;
      an applicating roller rotatably supported within said applicating station and positioned over said conveyor belt for applying spread onto said food item passing thereunder;

a spread-control roller rotatably supported within said applicating station and positioned adjacent said applicating roller to define an application gap therebetween, the distance between said spread-control roller and said applicating roller being adjustable whereby the size of said gap is varied to control the quantity of spread passing therethrough; and wherein said spread received from said pumping station is dispensed onto said applicating roller whereby subsequent rotation of said applicating roller results in application of said spread onto said food item.

7. The apparatus according to claim 6, further comprising:
a frame, said spread-control roller being rotatably supported on opposing sides of said frame;
a first pair of control gears, said first pair of control gears supported by said frame and rotatable with respect to said frame about a first axis located in the substantial center of each of said control gears; and
wherein said spread-control roller rotates about a second axis on each of said control gears, the axis being located at a pre-selected distance from said first axis whereby rotation of said control gears simultaneously moves said spread-control roller with respect to said applicating roller.

8. The apparatus according to claim 7, further comprising at least one adjustment gear, said adjustment gear being rotatably supported by said frame and engaging one of said control gears whereby rotation of said adjustment gear causes rotation of said control gears which simultaneously moves said spread-control roller with respect to said applicating roller.

9. The apparatus according to claim 8, further comprising:
a second adjustment gear rotatably supported by said frame and opposite said first adjustment gear, said second adjustment gear in rotatable contact with the other of said control gears;
a first shaft extending across the width of said frame and connecting said adjustment gears; and
an adjustment knob secured to one end of said first shaft.

10. The apparatus according to claim 9, further comprising a second shaft extending across the width of said frame for rotatably supporting said spread-control roller, said second shaft supported by said first pair of control gears, each end of said shaft extending through said control gears along said second axis.

11. The apparatus according to claim 10, further comprising a drive mechanism, and wherein said drive mechanism engages at least one end of said second shaft to rotate said spread-control roller during operation.

12. An apparatus for applying a spread packaged in a container onto a food item, comprising:
an applicating station for applying a pre-selected quantity of said spread onto said food item as said item is moved therethrough;
a pumping station in fluid communication with said applicating station for transporting said spread to said applicating station;
a conveyor belt for transporting said food items through said applicating station, wherein a first portion of said belt travels through a transportation path and a second portion of said belt travels through a return path;
a first collection basin positioned proximate an end of said conveyor belt and located downstream of said applicating station to collect excess spread contacting of said belt, said first collection basin being configured with a V-shaped cross-section to facilitate drainage of said spread therefrom;
a continuous wiper attached to said basin and extending across the width of said belt, said wiper positioned to contact said belt along said return path to scrape excess spread from said belt;
a drainage duct extending between said first collection basin and said container; and
a pair of opposing tracks located adjacent said conveyor belt, and wherein said first collection basin is provided with a plurality of hanging elements for slidably supporting said first collection basin on said tracks.

13. The apparatus according to claim 12, further comprising:
a second collection basin located to collect and remove excess spread from said applicating station; and
a duct extending between said second collection basin and said container.

14. An apparatus for applying a spread onto a food item, comprising:
an applicating station for applying a pre-selected quantity of said spread onto said food item as said food item is moved therethrough;
a pumping station for transporting said spread to said applicating station;
a conveyor belt for transporting said food items through said applicating station;
an applicating roller rotatably supported within said applicating station and positioned over said conveyor belt for applying said spread onto said food item passing thereunder;
a t-shaped nozzle positioned within said applicating station and in fluid communication with said pumping station, said t-shaped nozzle including a dispensing bar extending along at least a portion of said applicating roller whereby said spread supplied by said pumping station exits said dispensing bar and contacts said applicating roller.

15. The apparatus according to claim 14, wherein said dispensing bar includes a continuous slot extending thereacross for release of said spread.

16. The apparatus according to claim 14, wherein said dispensing bar includes discontinous slots thereacross for release of said spread.

* * * * *

UNITED STATES PATENT AND TRADEMARK OFFICE
CERTIFICATE OF CORRECTION

PATENT NO.         : 8,161,901 B1  
APPLICATION NO.    : 11/341213  
DATED              : April 24, 2012  
INVENTOR(S)        : DeGennaro et al.

Page 1 of 1

It is certified that error appears in the above-identified patent and that said Letters Patent is hereby corrected as shown below:

IN THE SPECIFICATION:

Column 4, line 67, now reads "cross-section with"

should read -- cross-section which --.

Column 8, line 44, now reads "apparatus, particular because"

should read -- apparatus, particularly because --.

Column 9, line 7, now reads "station 118 includes"

should read -- station 18 includes --.

Signed and Sealed this
Second Day of July, 2013

Teresa Stanek Rea
*Acting Director of the United States Patent and Trademark Office*